(12) United States Patent
Kim et al.

(10) Patent No.: US 8,806,194 B2
(45) Date of Patent: Aug. 12, 2014

(54) METHOD FOR AUTHENTICATING LOW PERFORMANCE DEVICE

(75) Inventors: Young Sam Kim, Daejeon (KR); Joon Heo, Daejeon (KR); Mun Seok Jeong, Seoul (KR)

(73) Assignee: Institute For Basic Science, Daejeon (KR)

( * ) Notice: Subject to any disclaimer, the term of this patent is extended or adjusted under 35 U.S.C. 154(b) by 176 days.

(21) Appl. No.: 13/588,505

(22) Filed: Aug. 17, 2012

(65) Prior Publication Data

US 2013/0346741 A1    Dec. 26, 2013

(30) Foreign Application Priority Data

Jun. 21, 2012  (KR) .................. 10-2012-0067014

(51) Int. Cl.
*H04L 9/32*    (2006.01)
(52) U.S. Cl.
USPC ........................... 713/155; 380/44; 713/169
(58) Field of Classification Search
None
See application file for complete search history.

(56) References Cited

U.S. PATENT DOCUMENTS 7,743,253 B2 *  6/2010  Lauter et al. .................. 713/170
2001/0036275 A1 * 11/2001  Murakami et al. ............ 380/277

FOREIGN PATENT DOCUMENTS

JP          2009-135871 A  *  6/2009

* cited by examiner

*Primary Examiner* — Jung Kim
*Assistant Examiner* — Ghodrat Jamshidi
(74) *Attorney, Agent, or Firm* — Lowe Hauptman & Ham, LLP.

(57) ABSTRACT

The present invention relate to a method for authenticating a low performance device, and more particularly, to a device authenticating method, in which a low performance device such as a smart meter of a smart grid is authenticated in a matrix operation instead of an exponential operation through a homomorphic hash function (HHF) of a non-square matrix M, so that the amount of operations required for authenticating the device can be reduced and the device can be safely authenticated even without a separate certificate authority.

11 Claims, 9 Drawing Sheets

METHOD FOR AUTHENTICATING LOW PERFORMANCE DEVICE

CROSS-REFERENCE TO RELATED APPLICATIONS

This application claims the benefit of Korean Patent Application No. 10-2012-0067014, filed on Jun. 21, 2012 in the Korean Intellectual Property Office, which is incorporated herein by reference in its entirety.

BACKGROUND OF THE INVENTION

1. Field of the Invention

Exemplary embodiments of the present invention relate to a method for authenticating a low performance device, and more particularly, to a device authenticating method, in which a low performance device such as a smart meter of a smart grid is authenticated in a matrix operation instead of an exponential operation through a homomorphic hash function (HHF) of a non-square matrix M, so that the amount of operations required for authenticating the device can be reduced and the device can be safely authenticated even without a separate certificate authority.

2. Description of Related Art

A smart grid refers to an intelligent power grid which optimizes efficiency of energy by incorporating information technology (IT) into a conventional unidirectional power grid composed of stages of 'generation of power—transmission of power—distribution of power—sales of power' and bi-directionally exchanging real-time information between power suppliers and power consumers. The basic concept of the smart grid is to interconnect power plants, power transmission and distribution facilities, and power consumers through an information communication network, and efficiently operate the entire power grid system as one body through information shared bi-directionally.

A power supplier may grasp a power usage state in real-time and flexibly control the amount of power supply using the smart grid, and a power consumer may grasp a power usage state in real-time and control the time and amount of power use by avoiding time zones of high rates based on the power usage state.

Figure 1:
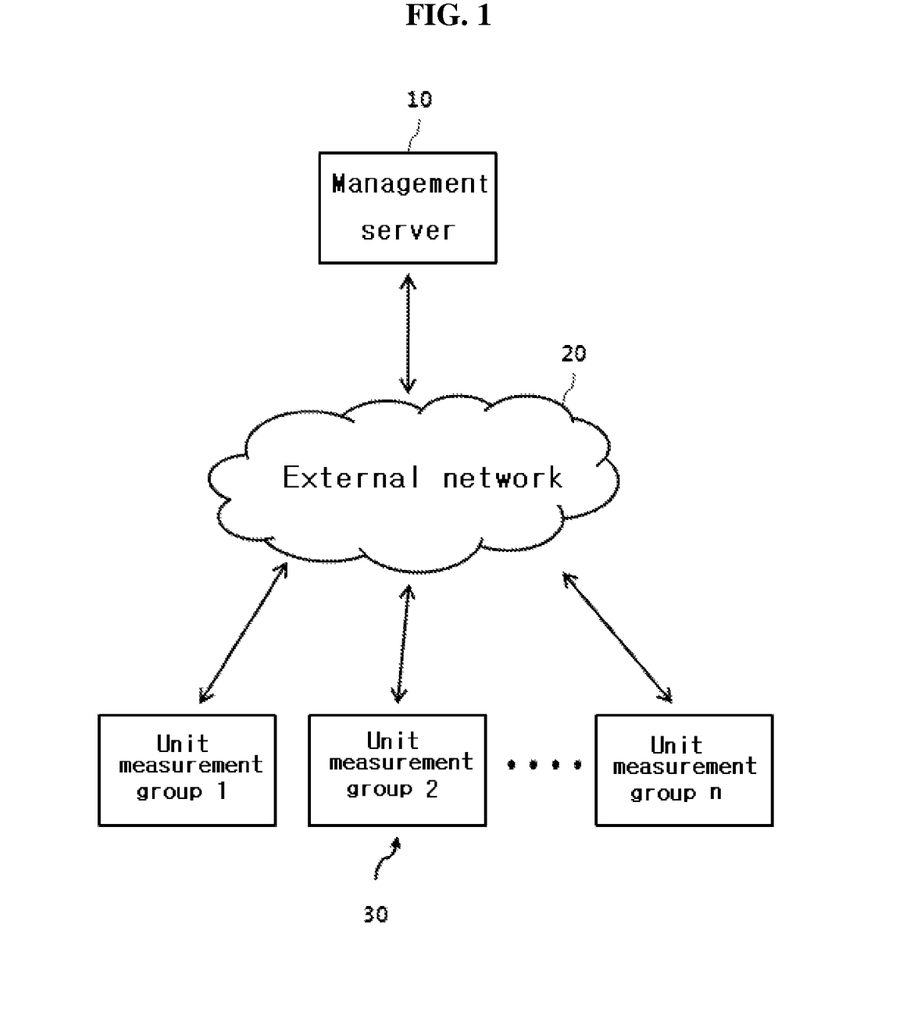
FIG. 1 is a functional block diagram showing the overall configuration of a smart grid system.
Figure 2:
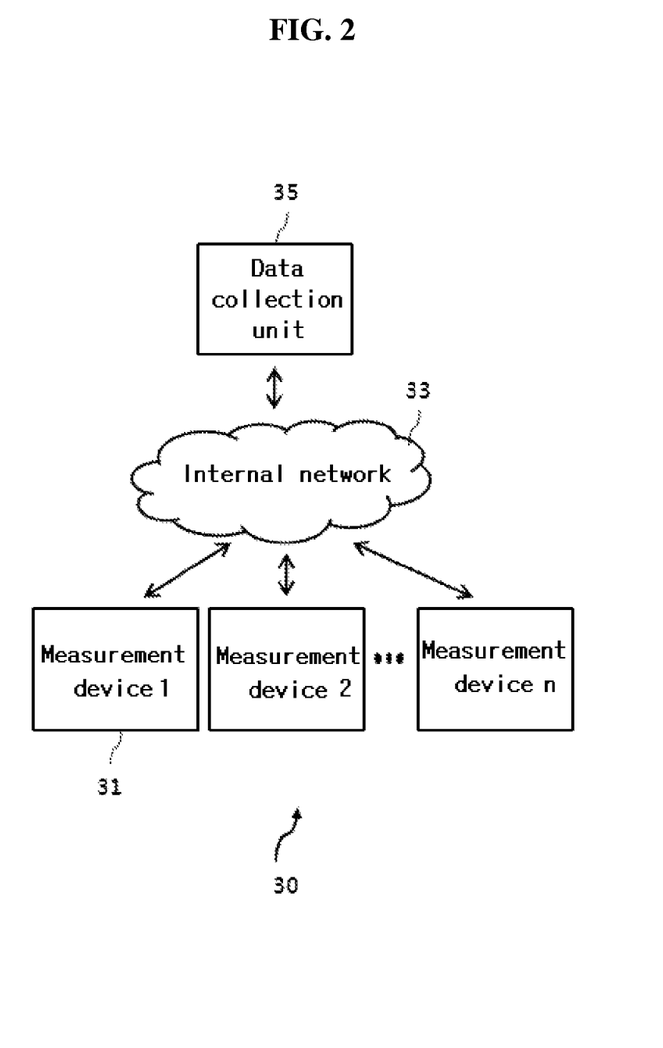
FIG. 2 is a functional block diagram showing a unit measurement group of a smart grid system in detail.

The configuration of such a smart grid system will be described hereinafter in further detail with reference to FIGS. 1 and 2.

A management server 10 and a plurality of unit measurement groups 30 are connected to an external network 20. Herein, the management server 10 is a server which receives information on power consumption measured from a unit measurement object such as a house, a building, a factory or the like in real-time and performs a billing process for the consumed power, or transmits power rates changing in real-time to the unit measurement object so that the unit measurement object may efficiently manage electricity based on the power rates. Meanwhile, the unit measurement group is a group that manages power consumption of the unit measurement object existing in an artificially set unit measurement area. The unit measurement group will be described in further detail with reference to FIG. 2. The unit measurement group 30 includes a plurality of measurement devices 31 connected to a data collection unit 35 through an internal network 33. The measurement device 31 measures information on the power consumed by the unit measurement object, and transmits information on the measured power consumption to the data collection unit 35 through the internal network 33 such as a power line communication (PLC), a Zigbee or the like, or receives power management information from the management server 10 through the external network 20 and the internal network 33.

Such a smart grid system performs end-to-end communications between the management server and the measurement device and transmits/receives commercial information such as information on power consumption, power rates and the like in real-time, and thus authentication between the management server and the measurement device and perfect security for the information transmitted and received between the management server and the measurement device are required.

A method for authenticating a device can be largely divided into a public key-based method and a symmetric key-based method. The symmetric key-based method has an advantage in that two devices are provided with a common symmetric key to authenticate each other based on the common symmetric key so that the amount of calculation needed for authentication is small. However, such a symmetric key-based method entails a problem in that the common symmetric key can be comparatively easily exposed to an unqualified third party, and thus if the common symmetric key is exposed to the third party, safe communication is not guaranteed.

On the other hand, in the case of public key-based method, devices performing authentication share a secret key unique to each device. The public key-based method entails a problem in that a device can be authenticated with high reliability using the secret key unique to the device, but an exponential operation is used in the authentication process, so that the method is difficult to implement in a low performance device, and needs a separate certificate authority.

In an attempt to solve the problems associated with the symmetric key- and public key-based authentication methods, an authentication method based on electronic signature between a smart meter and a management server is disclosed in Korean Patent Laid-Open Publication No. 2011-0019506 (hereinafter, referred to as "prior art 1"). For this authentication method, the smart meter has a security authentication module, and the security authentication module should store a pair of public keys for signature. Public key processing based on exponential operations can be performed without a problem since the management server is of high performance. However, since the smart meter is an embedded system having a relatively low operating capability, a high-performance security authentication module capable of performing electronic signature is used in the smart meter in order to solve this problem. However, prior technology 1 is difficult to be used in a smart grid system which uses low performance measurement devices.

In the meantime, Korean Patent Laid-Open Publication No. 2008-96181 (hereinafter, referred to as "prior art 2") discloses a method capable of authenticating a counterpart measurement device even without a separate certificate authority among a plurality of measurement devices constituting a power line communication network. In the prior art 2, a hash function based on a random number is used for authentication between a management server and a measurement device or between measurement devices, and the management server periodically updates the public key pair instead of not requiring communication with a third party authority. This public key pair is used to secure safety of communications. In relation to prior art 2, a method of authenticating a device according to an RSA encryption scheme involves a problem in that since it is based on complex exponential operations, it is difficult to be used in a smart grid system which uses low performance authentication devices.

SUMMARY OF THE INVENTION

Accordingly, the present invention has been made to solve the above-mentioned problems involved in the conventional prior art, and it is an object of the present invention to provide a method of authenticating a low performance authentication device such as a smart meter of a smart grid, using a matrix operation instead of an exponential operation through a homomorphic hash function (HHF) of a non-square matrix M.

Another object of the present invention is to provide a method of primarily and secondarily authenticating an authentication device through a calculated first group authentication request coefficient set and a second group authentication request coefficient set.

To achieve the above objects, the present invention provides a device authenticating method including the steps of: transmitting an identifier of an authentication device to an authentication server, by the authentication device; searching for an authentication server key matrix mapped to the identifier of the authentication device, by the authentication server; transmitting an arbitrary n-dimensional first vector $C_{MDMS}$ to the authentication device when the authentication server key matrix is searched, by the authentication server; calculating an authentication request coefficient set expressing a sum vector calculated from an authentication device key matrix and the n-dimensional first vector $C_{MDMS}$ as a linear combination for a basis vector of a square basis matrix, and transmitting the authentication request coefficient set to the authentication server, by the authentication device; and calculating an authentication confirmation coefficient set expressing an encryption sum vector as a linear combination for a column vector of an authentication server key matrix mapped to the identifier of the authentication device using the first group authentication request coefficient set, and authenticating the authentication device based on the authentication confirmation coefficient set and the authentication request coefficient set, by the authentication server.

Herein, the authentication device key matrix or the authentication server key matrix may be calculated by applying a square basis matrix to a non-square homomorphic hash function (HHF) and may be previously stored in the authentication server and the authentication device, the square basis matrix being previously stored in the authentication device.

The non-square homomorphic hash function (HHF) may be calculated by the following Equation 1:

$$HHF(x)=Mx=y(\bmod p) \quad \text{[Equation 1]}$$

wherein M denotes an m×n matrix (m and n are integers, m<n, and n>2), x denotes an n-dimensional vector, and mod p (p is a prime number) is a function having a remainder calculated by dividing a number by p as a value.

Preferably, the authentication device may transmit a first group authentication request coefficient set among the calculated authentication request coefficient set to the authentication server, and the authentication server may primarily authenticate the authentication device by comparing identity between a first group authentication confirmation coefficient set among the calculated authentication confirmation coefficient set and the first group authentication request coefficient set.

The device authenticating method according to the present invention may further include the steps of: when the authentication server primarily authenticates the authentication device, transmitting a first encryption key vector calculated from the authentication server key matrix and an n-dimensional second vector received from the authentication device to the authentication device, by the authentication server; and authenticating the authentication server by comparing a second encryption key vector calculated from the authentication device key matrix and the second vector with the first encryption key vector, by the authentication device.

The device authenticating method according to the present invention further includes the steps of: when the authentication device authenticates the authentication server, transmitting a second group authentication request coefficient set among the authentication request coefficient set to the authentication server, by the authentication device; and finally authenticating the authentication device by comparing the second group authentication request coefficient set with a second group authentication confirmation coefficient set among the authentication confirmation coefficient set, by the authentication server.

More specifically, the step of transmitting the first group authentication request coefficient set to the authentication server may further include the steps of: calculating an n-dimensional sum vector by applying the key matrix (m×n) of the authentication device and the first vector to a key addition function; calculating the authentication request coefficient set $(w_1, w_2, \ldots, w_n)$ expressing the sum vector as the linear combination for the basis vector of the square basis matrix, by applying the sum vector and the square basis matrix to an extracting coefficient function; and transmitting the first group authentication request coefficient set $(w_1, w_2, \ldots, w_{n-m+1})$ among the calculated authentication request coefficient set to the authentication server.

More specifically, the step of primarily authenticating the authentication device may further include the steps of: calculating the encryption sum vector by applying the sum vector to the non-square homomorphic hash function (HHF), by the authentication server; calculating the authentication confirmation coefficient set $(w_1', w_2', \ldots, w_n')$ expressing the encryption sum vector as a linear combination for a basis vector of the authentication server key matrix, by applying the encryption sum vector, the authentication server key matrix mapped to the identifier of the authentication device and the first group authentication request coefficient set to an extract coefficients function-variant; and primarily authenticating the authentication device by determining identity between the first group authentication confirmation coefficient set $(w_1', w_2', \ldots, w_{n-m+1}')$ among the authentication confirmation coefficient set and the first group authentication request coefficient set.

BRIEF DESCRIPTION OF THE DRAWINGS

The above and other objects, features and advantages of the present invention will be apparent from the following detailed description of the preferred embodiments of the invention in conjunction with the accompanying drawings, in which.

EXPLANATION ON SYMBOLS

10: Management server
20: External network
30: Unit measurement group
31: Measurement device
33: Internal network
35: Data collection unit
110: Sum vector calculation unit
120: Authentication request coefficient calculation unit
130: Management server authentication unit
140: Second vector creation unit
150: Authentication device DB
160: Transmit and receive unit
210: First vector creation unit
220: Encryption sum vector calculation unit
230: Authentication confirmation coefficient calculation unit
240: Authentication device authentication unit
250: First encryption key vector creation unit
260: Management server DB
270: Management server transmit and receive unit

DESCRIPTION OF SPECIFIC EMBODIMENTS

Hereinafter, a device authenticating method according to the present invention will be described in more detail with reference to the accompanying drawings.

Figure 3:
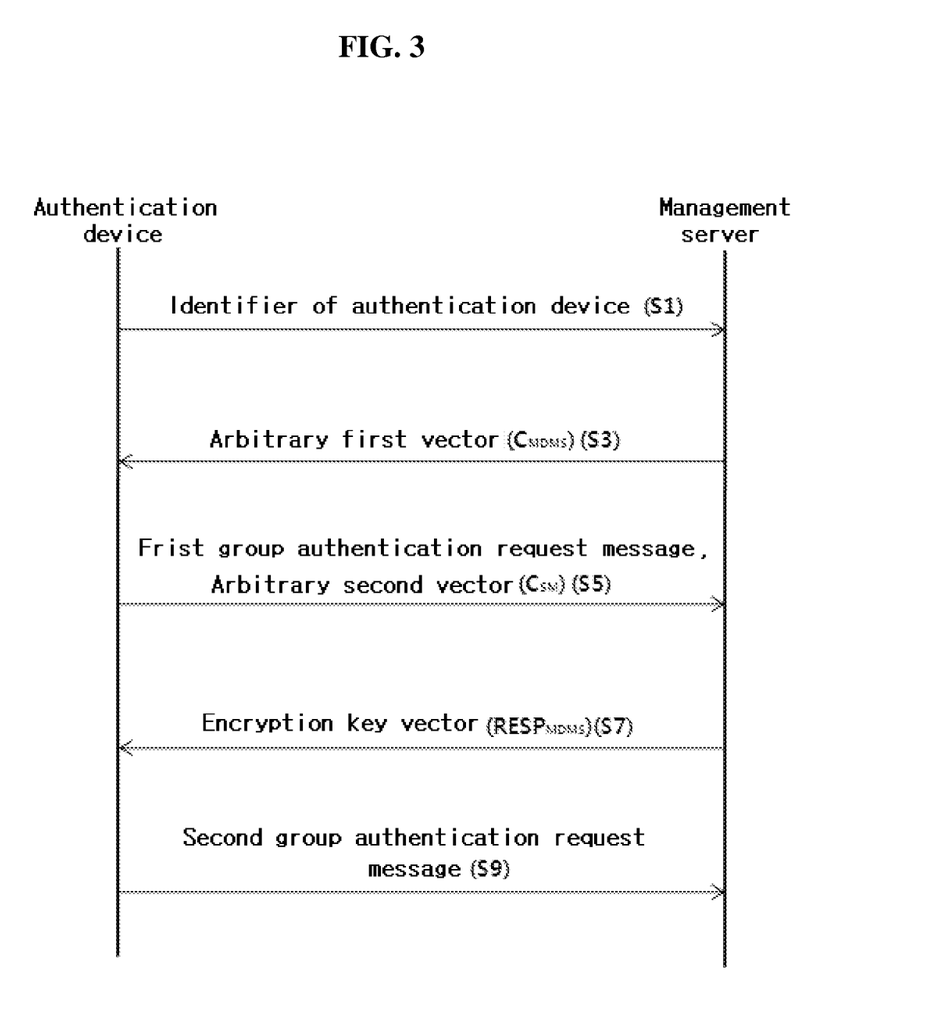
FIG. 3 is a sequence diagram showing messages exchanged between a management server and an authentication device in a device authenticating method according to the present invention.

FIG. 3 is a sequence diagram showing messages exchanged between a management server and an authentication device in a device authenticating method according to the present invention.

The message exchange between the management server and the authentication device will be described hereinafter in further detail with reference to FIG. 3.

Referring to FIG. 3, the authentication device transmits its own device identifier (ID) to a management server (S1). When the management server receives the device identifier from the authentication device, it determines whether or not there is a key matrix k mapped to the received device identifier. If there is a key matrix mapped to the received device identifier, the management server creates an arbitrary n-dimensional first vector $C_{MDMS}$ and transmits the first vector to the authentication device (S3).

The authentication device calculates an authentication request coefficient set w by applying a sum vector h calculated from the received first vector and the key matrix stored in the authentication device and a square basis matrix S stored in the authentication device to an extracting coefficient function (ECF), and transmits a first group authentication request coefficient set $cmt_{SM}$ among the calculated authentication request coefficient set and an arbitrary n-dimensional second vector $C_{SM}$ to the management server (S5).

The management server primarily authenticates the authentication device based on the first group authentication request coefficient set $cmt_{SM}$, and if the authentication device is primarily authenticated as a result of the authentication, the management server transmits a first encryption key vector $RESP_{MDMS}$, which is calculated by applying the key matrix and the second vector of the authentication device searched from the management server to an encryption function (Homomorphic Keyed Hash Function, HKHF), to the authentication device (S7). When the authentication device authenticates the management server based on the identity between a second encryption key vector e, which is calculated by applying the key matrix and the second vector stored in the authentication device to the encryption function, and the first encryption key vector received from the management server, the authentication device transmits a second group authentication request coefficient set $dcmt_{SM}$ to the management server (S9).

Herein, an n×n square basis matrix S, an m×n non-square random matrix M (wherein, m and n are integers, and m<n), and a key matrix k created by applying the base matrix and the random matrix to a homomorphic hash function (HHF) are previously created by the management server or an authentication device manufacturer. The basis matrix and the key matrix are stored in the authentication device, and the key matrix is mapped to the identifier of the authentication device and stored in the management server.

Figure 4:
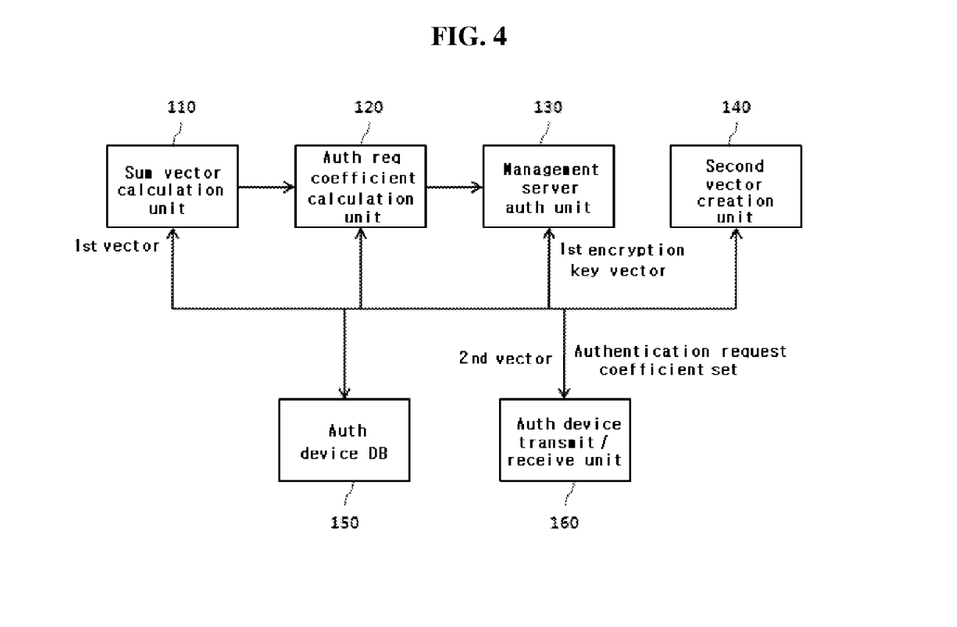
FIG. 4 is a functional block diagram showing an authentication device according to the present invention in detail.

FIG. 4 is a functional block diagram showing an authentication device according to the present invention in detail.

The authentication device will be described hereinafter in further detail with reference to FIG. 4.

Referring to FIG. 4, a sum vector calculation unit 110 creates a sum vector h by applying the first vector $C_{MDMS}$ received from the management server and the key matrix k of the authentication device stored in an authentication device DB 150 to a key addition function (KAF). An authentication request coefficient calculation unit 120 calculates an authentication request coefficient set w, which expresses the sum vector as a linear combination for a basis vector configuring a square basis matrix, by applying the sum vector and the square basis matrix stored in the authentication device DB 150 to an extracting coefficient function (ECF). A second vector creation unit 140 creates the arbitrary n-dimensional second vector $C_{SM}$, and an authentication device transmit and receive unit 160 transmits the second vector and the first group authentication request coefficient set among the authentication request coefficient set to the management server.

When a management server authentication unit 130 receives the first encryption key vector $RESP_{MDMS}$ from the management server through the authentication device transmit and receive unit 160, the management server authentication unit 130 creates the second encryption key vector by applying the key matrix and the second vector stored in the authentication device DB 150 to the encryption function (HKHF) and authenticates the management server based on the identity between the second encryption key vector and the first encryption key vector. When the management server authentication unit 130 authenticates the management server, the management server authentication unit 130 transmits the second group authentication request coefficient set among the authentication request coefficient set to the management server through the authentication device transmit and receive unit 160.

Figure 5:
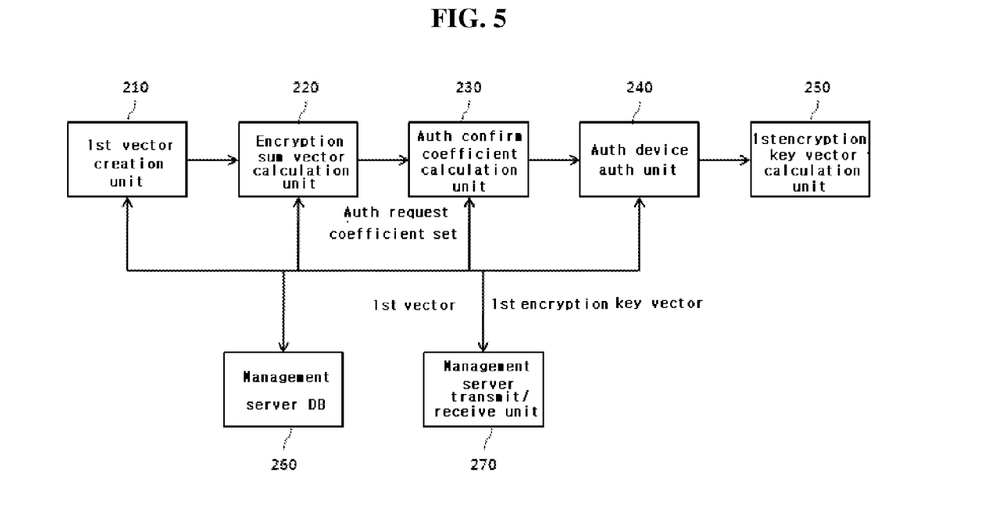
FIG. 5 is a functional block diagram showing a management server according to the present invention in detail.

FIG. 5 is a functional block diagram showing a management server according to the present invention in detail.

The management server according to the present invention will be described hereinafter in further detail with reference to FIG. 5.

Referring to FIG. 5, a first vector creation unit 210 receives a device identifier from the authentication device, and if the received device identifier is searched from a management server DB 260, the first vector creation unit 210 creates an arbitrary n-dimensional first vector $C_{MDMS}$. An encryption sum vector calculation unit 220 calculates an encryption sum vector d by applying the authentication device key matrix and the first vector stored in the management server DB 260 to the encryption function (HKHF). An authentication confirmation coefficient calculation unit 230 calculates an authentication confirmation coefficient set by applying the encryption sum vector, the authentication device key matrix stored in the management server DB 260 and the first group authentication request coefficient set to an Extract Coefficients Function-variant (ECF-v). An authentication device authentication unit 240 primarily authenticates the authentication device by comparing the identity between a first group authentication confirmation coefficient set of the calculated authentication confirmation coefficient set and the first group authentication request coefficient set.

When the authentication device authentication unit 240 primarily authenticates the authentication device, a first encryption key vector creation unit 250 calculates a first encryption key vector $RESP_{MDMS}$ by applying the authentication device key matrix and the second vector stored in the management server DB 260 to the encryption function (HKHF). A management server transmit and receive unit 270 transmits the calculated first encryption key vector $RESP_{MDMS}$ to the authentication device. When the authentication device authenticates the management server based on the first encryption key vector and the management server receives a second group authentication request coefficient set among the authentication request coefficient set from the authentication device, the authentication device authentication unit 240 finally authenticates the authentication device based on the identity between the second group authentication request coefficient set and a second group authentication confirmation coefficient set.

Figure 6:
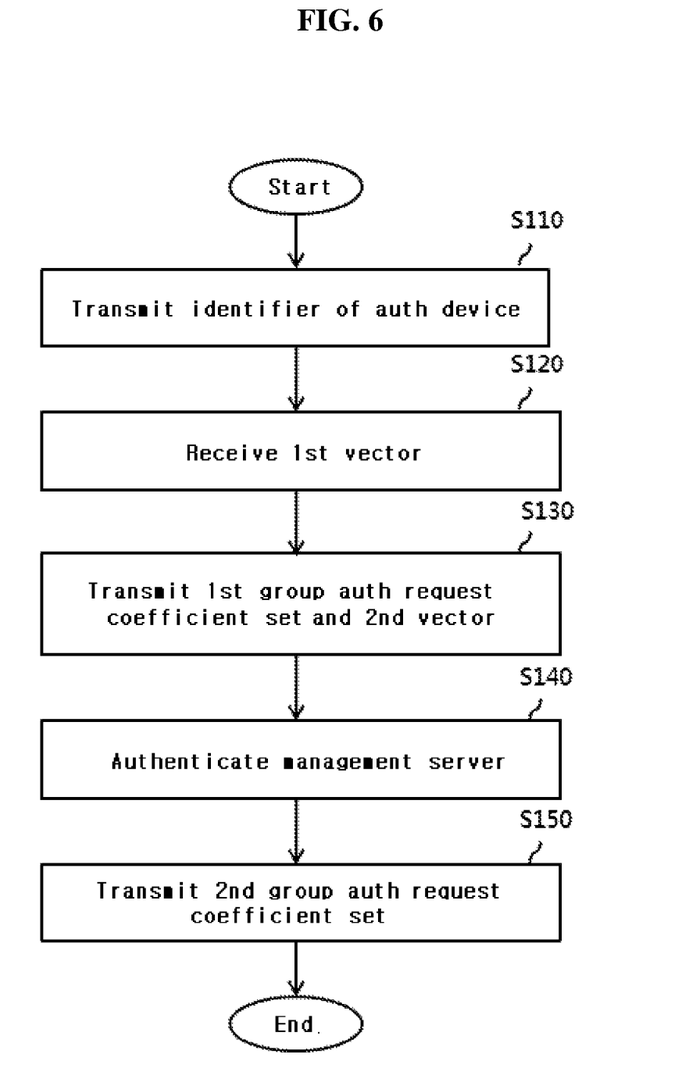
FIG. 6 is a flowchart illustrating a device authenticating method in an authentication device according to the present invention.

FIG. 6 is a flowchart illustrating a device authenticating method in an authentication device according to the present invention.

The device authenticating method in an authentication device will be described hereinafter in further detail with reference to FIG. 6.

Referring to FIG. 6, when it is desired to perform an authentication procedure between the authentication device and the management server, the authentication device transmits a device identifier to the management server (S110). The authentication device receives an arbitrary n-dimensional first vector $C_{MDMS}$ from the management server in response to the device identifier (S120).

The authentication device calculates an authentication request coefficient set from the authentication device key matrix, a sum vector calculated from the first vector and a square basis matrix of the authentication device and transmits a first group authentication request coefficient set among the calculated authentication request coefficient set and an arbitrary n-dimensional second vector $C_{SM}$ to the management server (S130). When the management server primarily authenticates the authentication device based on the first group authentication request coefficient set and the authentication device receives a first encryption key vector $RESP_{MDMS}$ from the management server, the authentication device authenticates the management server based on the identity between the receive first encryption key vector and a second encryption key vector calculated by the authentication device (S140). When the authentication device authenticates the management server, the authentication device requests final authentication of the authentication device by transmitting a second group authentication request coefficient set among the authentication request coefficient set to the management server (S150).

Herein, since the first encryption key vector received from the management server and the second encryption key vector calculated by the authentication device are the same only when the management server and the authentication device have the same key matrix and second vector, the management server is authenticated by the identity between the first encryption key vector and the second encryption key vector.

Figure 7:
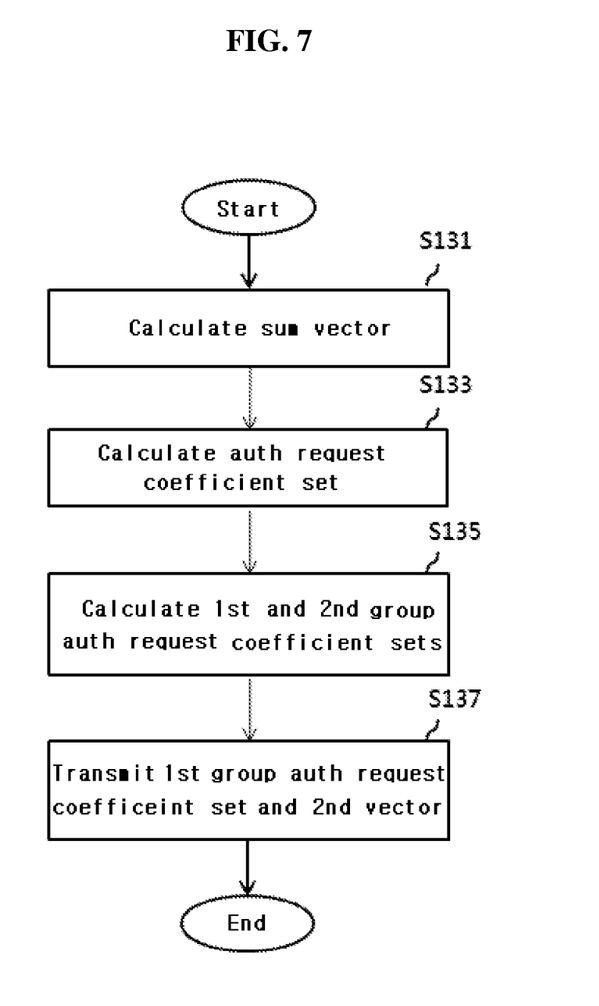
FIG. 7 is a flowchart illustrating the step of calculating an authentication request coefficient set in detail in a device authenticating method according to the present invention.

FIG. 7 is a flowchart illustrating the step of calculating an authentication request coefficient set in detail in a device authenticating method according to the present invention.

The step of calculating the authentication request coefficient set will be described hereinafter in further detail with reference to FIG. 7.

Referring to FIG. 7, a sum vector h is calculated by applying the first vector $C_{MDMS}$ received from the management server and the key matrix k stored in the authentication device DB to a key addition function (KAF) (S131). Herein, the key addition function (KAF) is a function of creating an n-dimensional vector by adding an m×n matrix and an n-dimensional vector.

For example, the sum vector is calculated from the key matrix k and the first vector $C_{MDMS}$ using the key addition function (KAF).

$$KAF(k, C_{MDMS}) = \begin{bmatrix} 6 & 1 & 10 \\ 4 & 2 & 8 \end{bmatrix} + (2, 3, 4)$$

$$= (6+4, 1+2, 10+8) + (2, 3, 4)$$

$$= (12, 6, 7)$$

$$= (1, 6, 6)(\mathrm{mod}\,11)$$

wherein, mod p (p is a prime number) is a function having a remainder calculated by dividing a number by p as a value.

An authentication request coefficient set is calculated by applying the calculated sum vector h and a square basis matrix stored in the authentication device DB to an extract coefficients function (ECF) (S133). Herein, the extracting coefficient function (ECF) is a function of calculating a set of coefficients which express the sum vector h as a linear combination of a basis vector s of a basis matrix S, and this is expressed as Equation 1 as shown below. Herein, the basis matrix is a matrix expressed as a mutually independent n-dimensional basis vector, which can express an n-dimensional sum vector as a linear combination.

$$ECF(h,S) = \{w_1, w_2, \ldots, w_n\} \quad \text{[Equation 1]}$$

For example, this is a function for calculating coefficients $(w_1, w_2, w_3)$ satisfying the following Equation 2 when $$S = \begin{bmatrix} 2 & 3 & 4 \\ 5 & 2 & 1 \\ 2 & 1 & 3 \end{bmatrix}$$

and h=(1, 6, 6):

$$\begin{bmatrix} 2 & 3 & 4 \\ 5 & 2 & 1 \\ 2 & 1 & 3 \end{bmatrix} \begin{bmatrix} w_1 \\ w_2 \\ w_3 \end{bmatrix} = \begin{bmatrix} 1 \\ 6 \\ 6 \end{bmatrix}. \quad \text{[Equation 2]}$$

A first group authentication request coefficient set $cmt_{SM}$ and a second group authentication request coefficient set $dcmt_{SM}$ are calculated from the calculated authentication request coefficient set as shown in Equation 3 (S135).

$$cmt_{SM} = (w_1, \ldots, w_{n-m+1})$$

$$dcmt_{SM} = (w_{n-m+2}, \ldots, w_n) \quad \text{[Equation 3]}$$

The first group authentication request coefficient set among the authentication request coefficient set and an arbitrary 1×n-dimensional second vector $C_{SM}$ are transmitted to the management server (S137).

Figure 8:
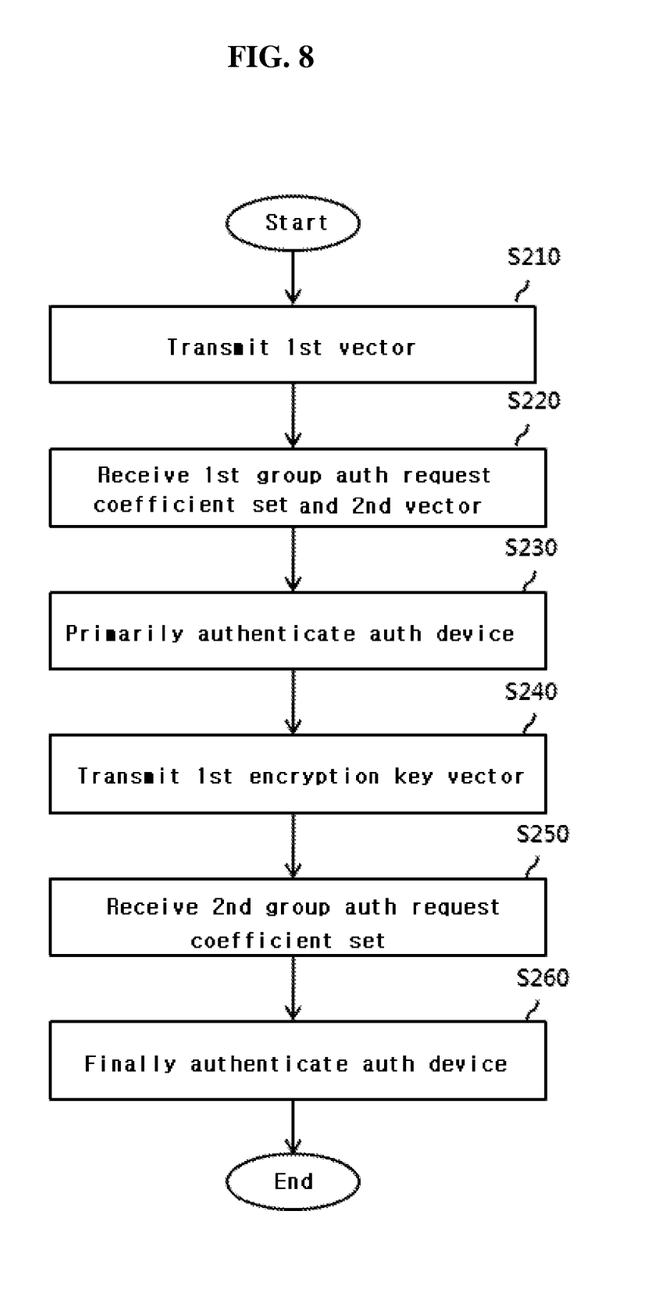
FIG. 8 is a flowchart illustrating a device authenticating method in a management server according to the present invention.

FIG. 8 is a flowchart illustrating a device authenticating method in a management server according to the present invention.

The device authenticating method in a management server will be described hereinafter in further detail with reference to FIG. 8.

Referring to FIG. 8, if the received device identifier exists in the management server DB, the management server creates an arbitrary n-dimensional first vector $C_{MDMS}$ and transmits the first vector to authentication device (S210). The management server receives the first group authentication request coefficient set and the second vector from the authentication device in response to the first vector (S220). The management server calculates an authentication confirmation coefficient set by applying an encryption sum vector calculated from the authentication device key matrix and the first vector stored in the management server DB, the authentication device key matrix and the first group authentication request coefficient set to an Extract Coefficients Function-variant, and primarily authenticates the authentication device by comparing the identity between the first group authentication confirmation coefficient set among the calculated authentication confirmation coefficient set and the received first group authentication request coefficient set (S230). When the authentication device is authenticated primarily, a first encryption key vector $RESP_{MDMS}$ calculated from the authentication device key matrix and the second vector stored in the management server DB is transmitted to the authentication device (S240).

When the management server is authenticated based on comparison of the identity between the second encryption key vector calculated by the authentication device and the first encryption key vector, the management server receives a second group authentication request coefficient set from the authentication device (S250). The management server finally authenticates the authentication device based on the identity between the received second group authentication request coefficient set and the second group authentication confirmation coefficient set (S260).

Figure 9:
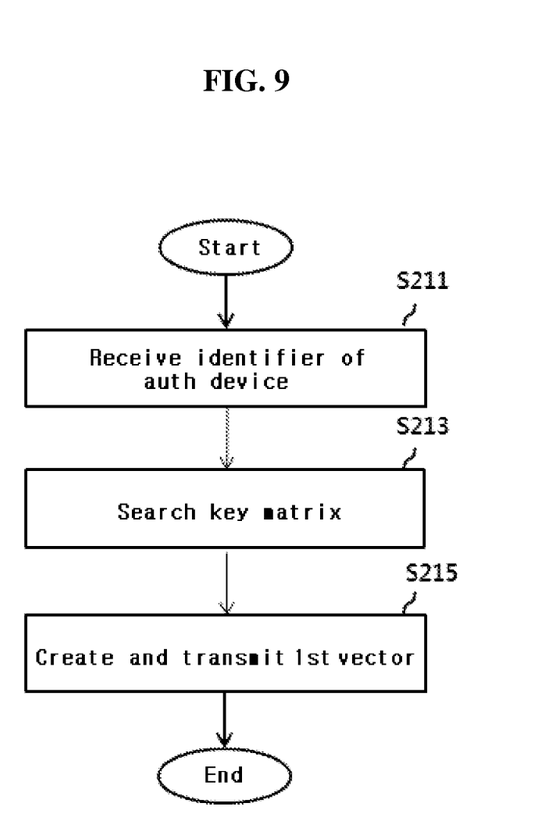
FIG. 9 is a flowchart illustrating the step of creating a first vector in detail in a device authenticating method according to the present invention.

FIG. 9 is a flowchart illustrating the step of creating a first vector in detail in a device authenticating method according to the present invention.

The step of creating a first vector will be described hereinafter in further detail with reference to FIG. 9.

Referring to FIG. 9, when it is desired to perform an authentication procedure, the management server receives a device identifier from the authentication device (S211). All device identifiers for performing data communications and a key matrix of each authentication device mapped to each device identifier are stored in the management server DB, and the management server searches for an authentication device key matrix mapped to the device identifier based on the received device identifier (S213).

If an authentication device key matrix mapped to the received device identifier is searched as a result, an arbitrary n-dimensional first vector $C_{MDMS}$ is created, and the created first vector is transmitted to the authentication device (S215).

Figure 10:
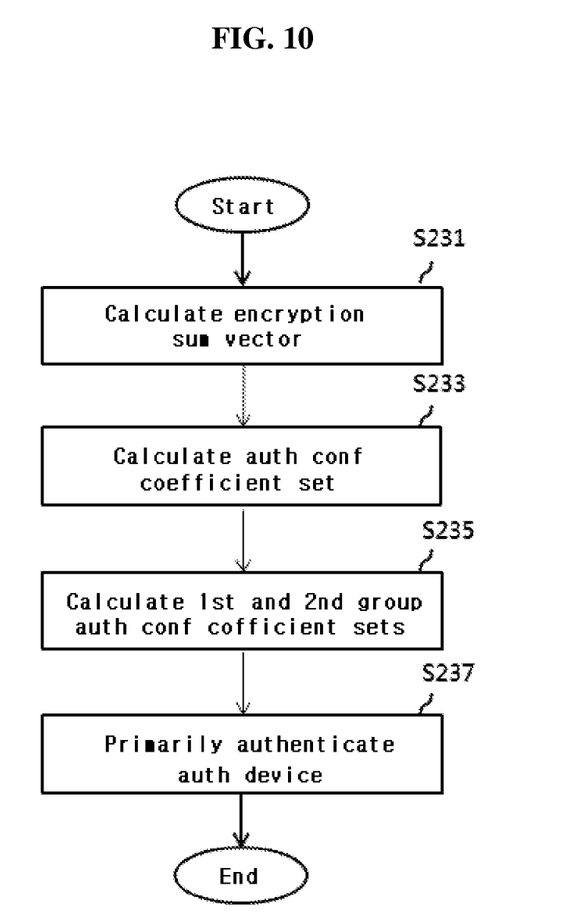
FIG. 10 is a flowchart illustrating the step of primarily authenticating an authentication device in detail in a device authenticating method according to the present invention.

FIG. 10 is a flowchart illustrating the step of primarily authenticating an authentication device in detail in a device authenticating method according to the present invention.

Referring to FIG. 10, an encryption sum vector d is calculated by applying the m×n key matrix k of the authentication device and the first vector $C_{MDMS}$ stored in the management server DB to an encryption function (HKHF) (S231). Herein, the encryption function (HKHF) is a function synthesizing a key addition function (KAF) and a homomorphic hash function (HHF), which is expressed by the following Equation 4:

$$d = HKHF(k, C_{MDMS}) = HHF(KAF(k, C_{MDMS})) = HHF(h) \pmod{p} \quad \text{[Equation 4]}$$

Herein, the homomorphic hash function (HHF) is a function of transforming an n-dimensional vector to an m-dimensional vector, which is expressed as shown in the following Equation 5:

$$HHF(h) = Mh = y \pmod{p} \quad \text{[Equation 5]}$$

wherein M denotes an m×n random matrix (m and n are integers, and m<n), and h denotes an n-dimensional vector. The homomorphic hash function has the characteristic as shown in following Equation 6 for vector c that is calculated by adding vector a, vector b, and a sum of vector a and vector b.

$$HHF(c) = Mc = M(a+b) = Ma + Mb = HHF(a) + HHF(b) \pmod{p} \quad \text{[Equation 6]}$$

An authentication confirmation coefficient set is calculated by applying the encryption sum vector d, the key matrix k of the authentication device stored in the management server DB and a part r of the first group authentication request coefficient set to an Extract Coefficients Function-variant (ECF-v) (S233). Herein, the extract coefficients function-variant (ECF-v) is expressed as shown in the following Equation 7.

$$ECF\text{-}v(d,k,r) = \{w_1', w_2', \ldots, w_n'\} \quad \text{[Equation 7]}$$

For example, when $$M = \begin{bmatrix} 2 & 1 & 4 \\ 3 & 1 & 2 \end{bmatrix}$$

in Equation 5 and h=(1, 6, 6), HHF(1, 6, 6) is calculated as shown in the following Equation 8.

$$d = HHF(1, 6, 6) = \begin{bmatrix} 2 & 1 & 4 \\ 3 & 1 & 2 \end{bmatrix} \begin{bmatrix} 1 \\ 6 \\ 6 \end{bmatrix} \quad \text{[Equation 8]}$$

$$= \begin{bmatrix} 32 \\ 21 \end{bmatrix}$$

$$= \begin{bmatrix} 10 \\ 10 \end{bmatrix} \pmod{11}$$

ECF-v(d, k, r) is a function of calculating coefficients ($w_2'$, $w_3'$) satisfying a Equation 9 as shown below when r=0:

$$\begin{bmatrix} 6 & 1 & 10 \\ 4 & 2 & 8 \end{bmatrix} \begin{bmatrix} 0 \\ w'_2 \\ w'_3 \end{bmatrix} = (10, 10)(\text{mod}\, 11).$$ [Equation 9]

A first group authentication confirmation coefficient set $cmt_{CS}$ and a second group authentication confirmation coefficient set $dcmt_{CS}$ are calculated from the calculated authentication confirmation coefficient set as shown in the following Equation 10 (S235):

$$cmt_{CS}=(w_1', \ldots, w_{n-m+1}')$$

$$dcmt_{cs}=(w_{n-m+2}', \ldots, w_n').$$ [Equation 10]

The identity between the first group authentication confirmation coefficient set and the first group authentication request coefficient set received from the authentication device is determined, and if it is determined that the first group authentication confirmation coefficient set is the same as the first group authentication request coefficient set, the management server primarily authenticates the authentication device (S237).

The identity between the authentication request coefficient set and the authentication confirmation coefficient set will be again described hereinafter in detail. The authentication request coefficient set $(w_1, \ldots, w_n)$ is calculated from the linear combination of the basis vector of the square basis matrix in the authentication device as follows:

$$h=w_1s_1+\ldots+w_ns_n.$$

On the other hand, the authentication confirmation coefficient set is calculated from the linear combination of the column vector of the key matrix, in the management server as follows:

$$d=w_1'k_1+\ldots+w_n'k_n.$$

wherein, $HHF(h)=HHF(w_1s_1+\ldots+w_ns_n)$, and this is expressed as follows due to the property of HHF:

$$HHF(w_1s_1+\ldots+w_ns_n)=w_1HHF(s_1)+\ldots+w_nHHF(s_n)$$
$$=w_1k_1+\ldots+w_nk_1.$$

Herein, since $HHF(h)=d$, $w_1k_1+\ldots+w_nk_1=w_1'k_1+\ldots+w_n'k_n$ is valid.

As described above, the device authenticating method according to the present invention has the following various effects.

First, the device authenticating method according to the present invention authenticates a device in a matrix operation through a homomorphic hash function (HHF) of a non-square matrix, so that the amount of operation needed for authenticating the device can be reduced.

Second, the device authenticating method according to the present invention authenticates a device with a small amount of matrix operation through a homomorphic hash function (HHF) of a non-square matrix M, so that the inventive method can be used for a low performance authentication device such as a smart meter of a smart grid.

Third, the device authenticating method according to the present invention can primarily authenticate an authentication device through the first group authentication request coefficient set and simultaneously finally authenticate the authentication device through the second group authentication request coefficient set.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

What is claimed is:

1. A method for authenticating a device, the method comprising the steps of:
    calculating an authentication request coefficient set expressing a sum vector calculated from an authentication device key matrix and an arbitrary n-dimensional first vector $C_{MDMS}$ as a linear combination for a basis vector of a square basis matrix, and transmitting the authentication request coefficient set to the authentication server, by the authentication device; and
    calculating an authentication confirmation coefficient set expressing an encryption sum vector as a linear combination for a column vector of an authentication server key matrix mapped to an identifier of the authentication device using the authentication server key matrix and the authentication request coefficient set, and authenticating the authentication device based on the authentication confirmation coefficient set and the authentication request coefficient set, by the authentication server,
    wherein the authentication device key matrix or the authentication server key matrix is calculated by applying a square basis matrix to a non-square homomorphic hash function (HHF) and is previously stored in the authentication server and the authentication device, the square basis matrix being previously stored in the authentication device.

2. The method according to claim 1, wherein the non-square homomorphic hash function (HHF) is calculated by the following Equation 1:

$$HHF(x)=Mx=y(\text{mod}\, p)$$ [Equation 1]

wherein M denotes an m×n matrix (m and n are integers, m<n, and n>2), x denotes an n-dimensional vector, and mod p (p is a prime number) is a function having a remainder calculated by dividing a number by p as a value.

3. The method according to claim 2, further comprising the steps of:
    transmitting an identifier of the authentication device to the authentication server, by the authentication device;
    searching for an authentication server key matrix mapped to the received identifier of the authentication device, by the authentication server; and
    transmitting the first vector to the authentication device when the authentication server key matrix is searched, by the authentication server.

4. The method according to claim 3, wherein the authentication device transmits a first group authentication request coefficient set among the calculated authentication request coefficient set to the authentication server, and the authentication server primarily authenticates the authentication device by comparing identity between a first group authentication confirmation coefficient set and the first group authentication request coefficient set.

5. The method according to claim 4, further comprising the steps of:
    when the authentication server primarily authenticates the authentication device, transmitting a first encryption key vector calculated from the authentication server key matrix and an n-dimensional second vector received from the authentication device to the authentication device, by the authentication server; and authenticating the authentication server by comparing a second encryption key vector calculated from the authentication device key matrix and the second vector with the first encryption key vector, by the authentication device.

6. The method according to claim 5, further comprising the steps of:

when the authentication device authenticates the authentication server, transmitting a second group authentication request coefficient set among the authentication request coefficient set to the authentication server, by the authentication device; and finally authenticating the authentication device by comparing the second group authentication request coefficient set with a second group authentication confirmation coefficient set among the authentication confirmation coefficient set, by the authentication server.

7. The method according to claim 4, wherein the step of transmitting the first group authentication request coefficient set to the authentication server further comprises the steps of:

calculating an n-dimensional sum vector by applying the key matrix (m×n) of the authentication device and the first vector to a key addition function;

calculating the authentication request coefficient set ($w_1$, $w_2$, ..., $w_n$) expressing the sum vector as the linear combination for the basis vector of the square basis matrix, by applying the sum vector and the square basis matrix to an extracting coefficient function; and transmitting the first group authentication request coefficient set ($w_1$, $w_2$, ..., $w_{n-m+1}$) among the calculated authentication request coefficient set to the authentication server.

8. The method according to claim 7, wherein the step of primarily authenticating the authentication device further comprises the steps of:

calculating the encryption sum vector by applying the sum vector to the non-square homomorphic hash function (HHF), by the authentication server;

calculating the authentication confirmation coefficient set ($w_1'$, $w_2'$, ..., $w_n'$) expressing the encryption sum vector as a linear combination for a column vector of the authentication server key matrix, by applying the encryption sum vector, the authentication server key matrix mapped to the identifier of the authentication device and the first group authentication request coefficient set to an extract coefficients function-variant; and primarily authenticating the authentication device by determining identity between the first group authentication confirmation coefficient set ($w_1'$, $w_2'$, ..., $w_{n-m+1}'$) among the authentication confirmation coefficient set and the first group authentication request coefficient set.

9. A method for authenticating a device, the method comprising the steps of:

transmitting an arbitrary n-dimensional first vector $C_{MDMS}$ to an authentication device, by an authentication server;

transmitting a first group authentication request coefficient set among an authentication request coefficient set expressing a sum vector calculated from an authentication device key matrix and the n-dimensional first vector $C_{MDMS}$ as a linear combination for a basis vector of a square basis matrix, and an arbitrary n-dimensional second vector $C_{SM}$ to the authentication server, by the authentication device;

calculating an authentication confirmation coefficient set expressing an encryption sum vector as a linear combination for a column vector of an authentication server key matrix mapped to the identifier of the authentication device using the first group authentication request coefficient set, and primarily authenticating the authentication device based on a first group authentication confirmation coefficient set among the authentication confirmation coefficient set and the first group authentication request coefficient set, by the authentication server;

when the authentication server primarily authenticates the authentication device, transmitting a first encryption key vector calculated from the authentication server key matrix and the n-dimensional second vector to the authentication device, by the authentication server;

authenticating the authentication server by comparing a second encryption key vector calculated from the authentication device key matrix and the n-dimensional second vector with the first encryption key vector, by the authentication device;

when the authentication device authenticates the authentication server, transmitting a second group authentication request coefficient set among the authentication request coefficient set to the authentication server, by the authentication device; and finally authenticating the authentication device by comparing the second group authentication request coefficient set with a second group authentication confirmation coefficient set among the authentication confirmation coefficient set, by the authentication server.

10. The method according to claim 9, wherein the authentication device key matrix or the authentication server key matrix is calculated by applying a square basis matrix to a non-square homomorphic hash function (HHF) and is previously stored in the authentication server and the authentication device, the square basis matrix being previously stored in the authentication device.

11. The method according to claim 10, wherein the non-square homomorphic hash function (HHF) is calculated by the following Equation 1:

$$HHF(x) = Mx = y \pmod{p} \qquad \text{[Equation 1]}$$

wherein M denotes an m×n matrix (m and n are integers, m<n, and n>2), x denotes an n-dimensional vector, and mod p (p is a prime number) is a function having a remainder calculated by dividing a number by p as a value.

* * * * *